United States Patent [19]

Thumm

[11] Patent Number: 5,226,869
[45] Date of Patent: Jul. 13, 1993

[54] METHOD AND APPARATUS FOR CHANGING THE TOOL DISK OF A TOOL TURRET

[75] Inventor: Helmut Thumm, Metzingen, Fed. Rep. of Germany

[73] Assignee: Sauter Feinmechanik GmbH, Metzingen, Fed. Rep. of Germany

[21] Appl. No.: 801,851

[22] Filed: Dec. 3, 1991

[30] Foreign Application Priority Data

Dec. 8, 1990 [DE] Fed. Rep. of Germany ....... 4039227

[51] Int. Cl.$^5$ ............................................ B23Q 3/155
[52] U.S. Cl. .................................. 483/1; 29/48.5 A; 409/211; 409/233; 483/32
[58] Field of Search ................ 483/1, 32; 29/48.5 R, 29/48.5 A, 49; 74/813 L, 826; 409/224, 233, 211

[56] References Cited

U.S. PATENT DOCUMENTS

| 1,695,926 | 12/1928 | Libert . | |
|---|---|---|---|
| 3,757,637 | 9/1973 | Eich et al. | 409/241 X |
| 4,575,291 | 3/1986 | Babel | 74/813 L |
| 4,989,303 | 2/1991 | Sauter et al. | 29/48.5 A |

FOREIGN PATENT DOCUMENTS

| 1552326 | 1/1970 | Fed. Rep. of Germany . | |
|---|---|---|---|
| 2429330 | 1/1976 | Fed. Rep. of Germany | 408/35 |
| 3817893 | 11/1989 | Fed. Rep. of Germany . | |
| 0255339 | 12/1985 | Japan | 483/32 |

OTHER PUBLICATIONS

Brockhaus, Enzyklopädie, vol. 2, p. 232 1967 F. A. Brockhaus, Wiebaden, Germany.
Hanbuch der Fertigungstechnik, vol. 311 pp. 214–215, Carl Haaser Verlag München Wrn, Germany, 1979.

*Primary Examiner*—Z. R. Bilinsky
*Attorney, Agent, or Firm*—Roylance, Abrams, Berdo & Goodman

[57] ABSTRACT

For changing the tool disk connected detachably and rotatably to the housing of a tool turret, a work-locating fixture is provided. The tool disk can be moved out of its work setting in which it is coupled with the drive shaft for rotation by a rotary drive. The tool disk movement is in the axial direction of the drive shaft away from the housing until the tool disk reaches transfer position. The drive shaft and a tie rod coupled to the drive shaft are then rotated by the rotary drive out of a connected setting into a detached setting. In the detached setting, the connection between the tie rod, which tie rod is slidable in its axial position relative to the housing and the tool disk, is disconnected, so that the tie rod can then be lifted out of the tool disk. Subsequently, the tie rod can be brought into engagement with another tool disk and then can be rotated by the rotary drive out of the detached setting into the connected setting, in which the tie rod is connected to positively lock in axial directions the tie rod with the tool disk. As a result of relative movement between the housing and the tool disk, the tool disk can be brought into its work setting and then can be clamped tightly.

16 Claims, 3 Drawing Sheets

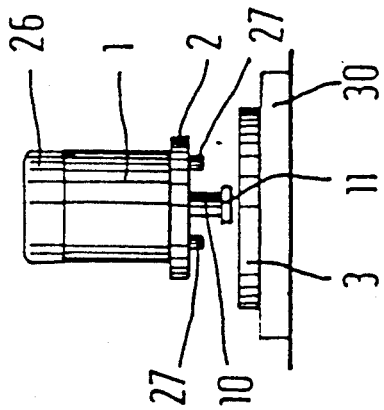
Fig.1a
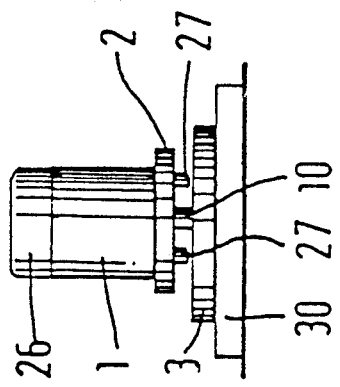
Fig.1b
Fig.1c
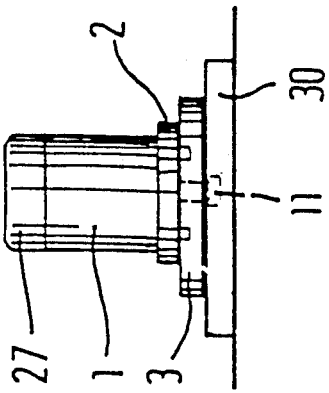
Fig.1d
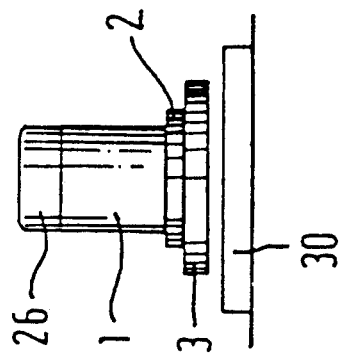
Fig.1e
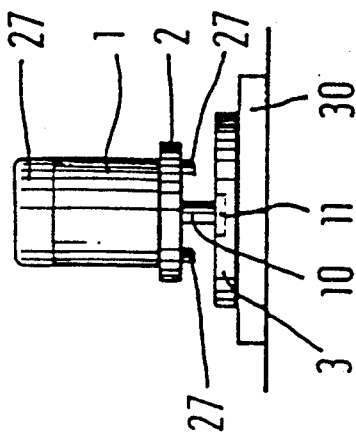

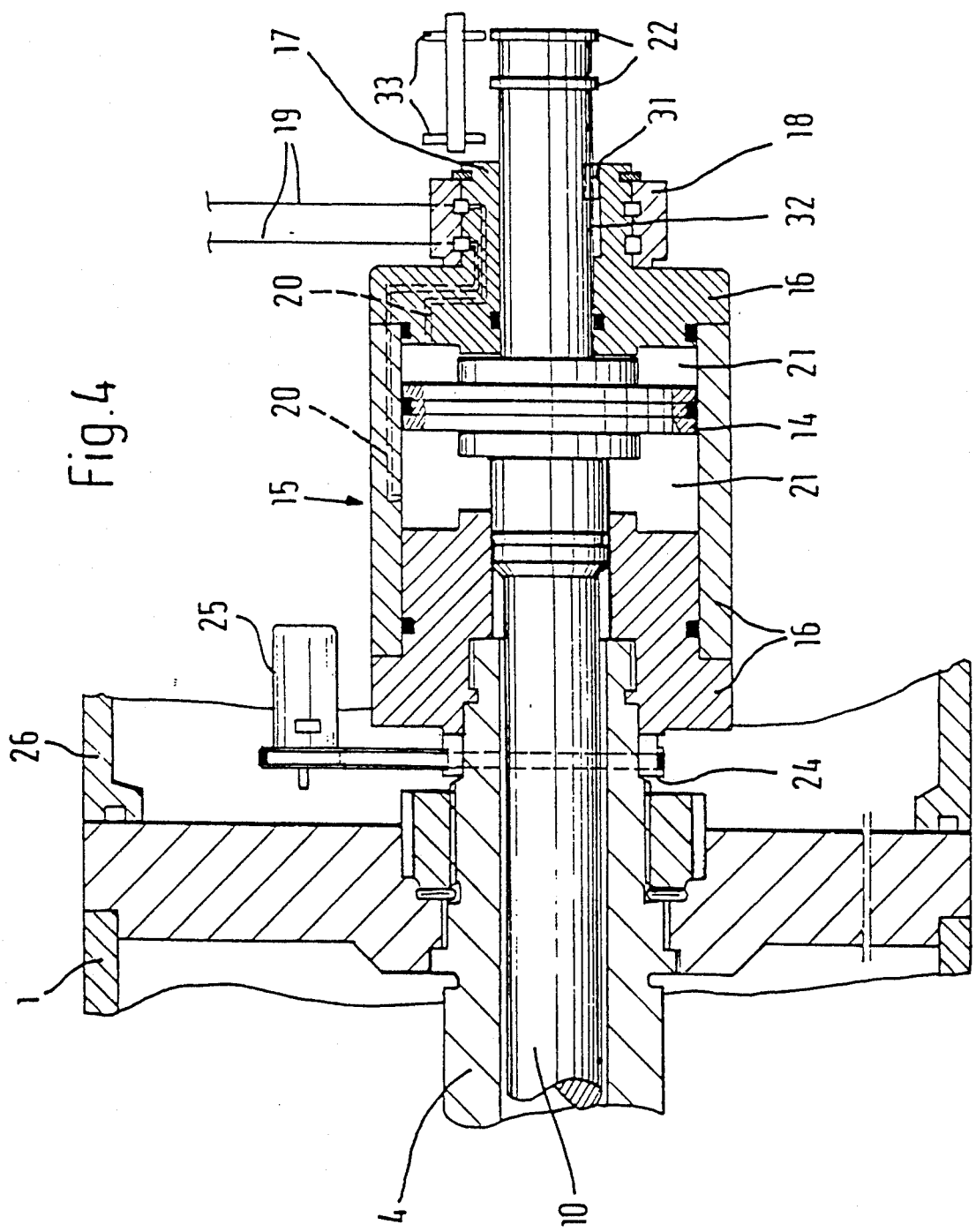

METHOD AND APPARATUS FOR CHANGING THE TOOL DISK OF A TOOL TURRET

FIELD OF THE INVENTION

The present invention relates to a method and apparatus for changing the tool disk which is connected detachably with the housing of a tool turret and is rotatable relative to said housing.

BACKGROUND OF THE INVENTION

In tool turrets, it is customary to change only the tools or tool modules supported by the tool disk, but not to change the tool disk itself. However, there are some operational possibilities of tool turrets in which a change of the tool disk would be advantageous.

SUMMARY OF THE INVENTION

An object of the present invention is to provide a method for changing the tool disks of tool turrets which requires only simple procedures for detachment of the tool disk and for connection of the tool disk with the tool turret.

This object is attained by a method for changing a tool disk carrying tools on a turret, the tool disk being connected detachably with a tool disk mounting which in turn can be rotated relative to a housing of the tool turret and can be locked at certain desired angular settings with the housing. The method comprises the steps of a) removing the tool disk from a work setting in which the tool disk is coupled with a drive shaft rotatable by a rotary drive by moving the tool disk along the axis of the drive shaft away from the housing until the tool disk reaches a transfer position in which the tool disk is picked up by a conveyor device, b) rotating the drive shaft and a tie rod coupled therewith by means of the rotary drive out of a connection setting and into a detached setting disconnecting the tie rod from the tool disk, c) removing the tie rod from the tool disk, d) moving the tool disk from the transfer position and placing a different tool disk into the transfer position, e) engaging the tie rod with the different tool disk, f) rotating the drive shaft and the tie rod by means of the rotary drive from the detached setting into the connection setting in which the tie rod is connected and positively locked with the different tool disk in the axial direction, and g) moving the different tool disk to the work setting by a relative movement between the housing and the tool disk.

A tie rod, which is part of the assembly, must carry out only simple translation and rotary movements, both for detachment of the tool disk from the tool turret and for connection of the tool disk to the tool turret. The present invention provides for the execution of quite simple movements. One special advantage of the method according to the present invention involves the rotary movements being carried out by means of the rotary drive of the tool turret.

Another object of the invention is to provide a low-cost tool turret for performing the method according to the present invention.

This object is attained by a tool turret comprising, a tool turret housing, a tool disk mounting located in the housing, and a tool disk having a first coupling means. A central drive shaft is coupled to the tool disk mounting for simultaneous rotation therewith relative to the housing by a rotary drive. A tie rod is arranged concentrically relative to the drive shaft and is axially slidable relative to the housing. The tie rod is nonrotatably coupled to the drive shaft. A control means is coupled to the tie rod for controlling axial movement of the tie rod. A second coupling means on one end of the tie rod engages the first coupling means to releasably couple the tie rod and tool disk and to permit relative rotational movement of coupling means between a release position in which the tie rod and tool disk can be detached and a locking position in which the tie rod and tool disk are positively locked in A tool turret of this sort is similar to known tool turrets, which allow only a changing of tools or tool modules. It requires additionally only work-locating fixture with a tie rod which can be coupled with the tool disk and uncoupled therefrom. In addition to the rotary drive of the tool turret itself, it requires only a linear drive.

At least one axially projecting carrier element is provided for transmission of the torque moment from the tool disk mounting to the tool disk. This carrier element can be drawn out of a correspondingly configured recess in in the tool disk by a movement of the tool disk away from the tool disk mounting. Execution of the detachment and the nonrotating connection between tool disk and tool disk mounting then requires only one axial movement of the tool disk relative to the tool turret, so that in operational state the work-locating fixture need only hold the tool disk in its mounting on the tool disk mounting.

In one preferred embodiment, the coupling which connects the tie rod with the tool disk is configured as a bayonet catch. The construction of such lock or catch is easy to realize. For detachment and for locking, this lock or catch requires only a revolution of the two parts relative to one another.

Furthermore, it is especially advantageous to configure the drive shaft of the tool turret as a hollow shaft and to guide the tie rod through the drive shaft until it reaches the control mechanism. Since this control mechanism need only actuate a longitudinal slide of the tie rod, basically any known linear drive serves this purpose. In the one preferred embodiment, however, the control mechanism is configured as a cylinder-piston assembly arranged coaxially to the tie rod. Both the space required and the cost outlay for such assembly are low.

The arrangement of the control mechanism in the connection line at the end of the drive shaft remote from the tool disk is advantageous, since at his point sufficient space is generally available for mounting of the control mechanism. In addition, the control mechanism can then be nonrotatably connected with the drive shaft in a constructively simpler manner.

A sensing device is preferably provided for monitoring the axial setting of the tie rod relative to the turret housing. It can then be controlled in a simple manner, whether or not the tool turret is again ready for operation following a change of the tool disk. However, the signals from such sensing device can also be used for automatic control of the changing of the tool disk.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIGS. 1a-1e are diagrammatic side elevational views of an apparatus according to the present invention illustrating relative positions of the tool disk, the tool turret and a pallet in separate steps of the disk changing method;

FIG. 4 is a side elevational view in section of the apparatus through a rearward part of the tool turret.

DETAILED DESCRIPTION OF THE INVENTION

Figure 3:
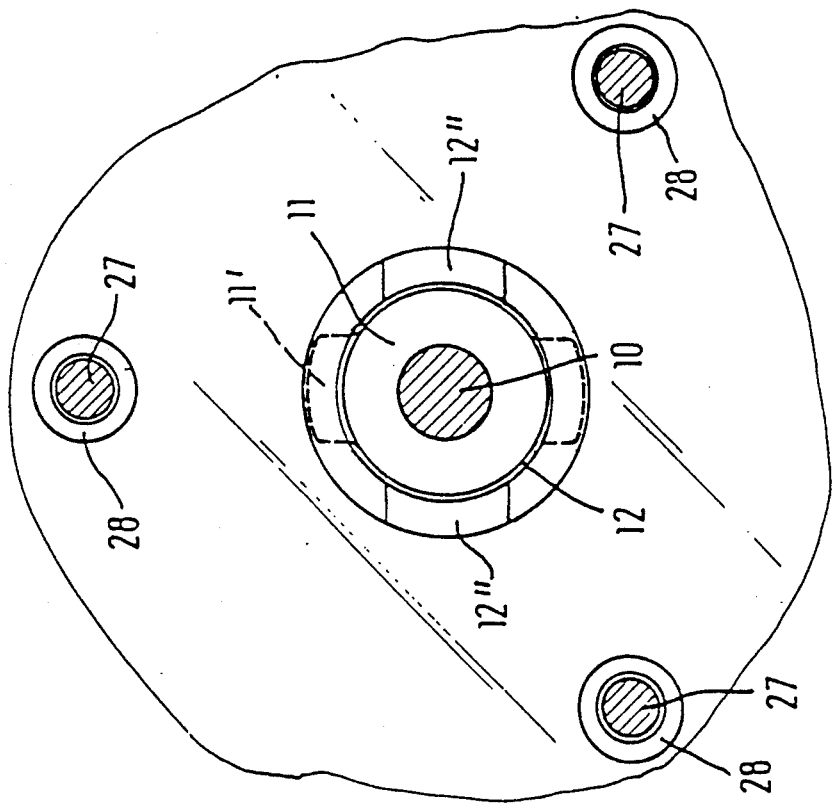
FIG. 2 is a partial side elevational view in section of the apparatus of FIG. 1 through the tool turret and FIG. 3 is a partial elevational view in section of the apparatus taken along line III—III of FIG. 2.

In the area of one end of a housing 1 of a tool turret a tool disk mounting 2 is rotatably mounted. Mounting 2 is rotatable, but axially nonslidable, has a form similar to a disk, and on its side remote from housing 1, forms a flat bearing surface for a tool disk 3. Tool disk mounting 2 incorporates a drive shaft 4, configured as a hollow shaft, mounted rotatably in housing 1. Drive shaft 4 is screwed into the side of mounting 2 turned away from tool disk 3. On the side of tool disk mounting 2, turned away from tool disk 3, a toothed rim 5 is arranged concentric to drive shaft 4.

The radially arranged teeth of rim 5 are radially aligned with radially extending teeth on the outside of a second toothed rim 6 on a ring 7 connected tightly or fixedly with housing 1. An axially slidable interlocking locking mechanism 8 has, on its front side facing both toothed rims 5 and 6, a toothed rim 8'. Toothed rim 8' can engage simultaneously toothed rims 5 and 6. Tool disk mounting 2 is then nonrotatably interlocked with housing 1 with angular precision in one of the selectable angle settings.

The axial setting of interlocking locking mechanism 8 relative to tool disk mounting 2 and ring 7 is determined in a known manner by means of a control member (not shown). The control member is mounted concentric to drive shaft 4, is rotatable in housing 1 adjacent to interlocking mechanism 8, and is provided with a cam or catch path on its surface facing mechanism 8. The cam or catch path engages rollers 9 which are part of the interlocking locking mechanism, as shown, for example in U.S. Pat. Nos. 4,991,474, 4,989,303 and 4,972,744, the subject matters thereof being hereby incorporated by reference.

Figure 2:
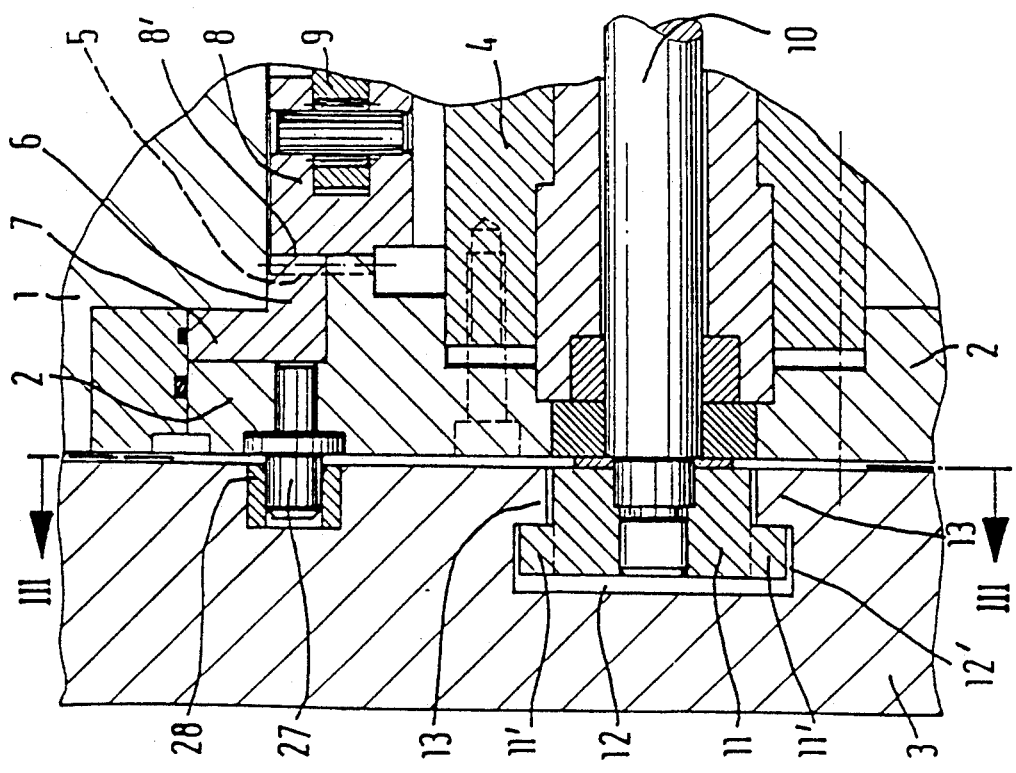

A tie rod 10 is guided through the hollow drive shaft 4, and projects from shaft 4 beyond the bearing surface of tool disk mounting 2 supporting tool disk 3. At this forward location, the tie rod supports a coupling head 11. Coupling head 11 is connected securely with tie rod 10 and has a cylindrical middle section from which two catches 11' radially extend and are arranged diametrically opposite one another. As shown in FIG. 2, catches 11' are offset or spaced axially relative to the rear surface of the middle section turned toward tool disk mounting 2. Thus, coupling head 11 has cross-sectional dimensions in the shape of a hammerhead.

In the center of its side turned toward tool disk mounting 2, tool disk 3 is provided with a recess 12 extending into disk 3. The axial depth of recess 12 is somewhat greater than the axial length of coupling head 11. Recess 12 forms a bayonet fastening or coupling with coupling head 11. From a cylindrical inside area of recess 12, annular groove 12' extends radially into disk 3 at some distance from the rear surface of tool disk 3 facing tool disk mounting 2. The annular material portion 13, located between annular groove 12' and the rear surface of tool disk 3 facing tool disk mounting 2, is provided at two diametrically opposite points with axially running channels 12''. By means of channels 12'', catches 11' can be guided into recess 12 and can be removed therefrom. As shown in FIGS. 2 and 3, catches 11' fit behind the material portions 13 in an angular position rotated 90° in relation to the other angular position.

As shown in FIG. 4, tie rod 10 extends outward beyond the rear end of drive shaft 4 remote from tool disk mounting 2. Adjacent the drive shaft rear end, tie rod 10 securely supports a piston 14 of a double acting hydraulic cylinder-piston assembly 15. The cylinder 16 of cylinder-piston assembly 15, which is holding piston 14, concentrically overlaps the rear end of drive shaft 4 and is connected securely with this end section. On the side turned away from drive shaft 4, cylinder 16 has a hublike extension 17. Tie rod 10 forms the piston rod, and is connected to cylinder 16 by means of a fitting key 31 and an axial groove 32 receiving the fitting key but remains axially slidable relative to housing 16. Extension 17, together with an annular body 18 surrounding extension 17, forms a hydraulic rotary scanning and control unit. The scanning and control unit forms the connection between stationary connection lines 19 and bores 20 of cylinder 18, which open into one or the other work chamber 21 of cylinder 18.

An end segment of tie rod 10 projecting beyond extension 17 incorporates control rings 22 arranged at some axial spacing from one another. Rings 22, together with two stationary limit switches 33, form a sensing arrangement for monitoring the setting of tie rod 10.

A sprocket, which is part of a gearing arrangement, is tightly or fixedly mounted on drive shaft 4. An electric motor may rotate drive shaft 4 via that sprocket. In addition to the sprocket, a belt pulley 24 is also securely connected with drive shaft 4. A cog belt runs over pulley 24, and transmits the rotary movements of drive shaft 4 to an angular setting transmitter 25.

The electric motor, the angular setting transmitter 25 and the cylinder-piston assembly 15 are covered by a protective hood 26. Hood 26 is attached to housing 1, and is shown only in FIG. 4.

For torque moment transmission between tool disk 3 and tool disk mounting 2, mounting 2 includes a plurality of carrier bolts 27, three in the exemplary embodiment. Carrier bolts 27 are offset in relation to one another with uniform spacing around the periphery, are equally spaced from the longitudinal axis of drive shaft 4, and project from the bearing surface of tool disk mounting 2 which faces tool disk 3. To hold these carrier bolts without play, tool disk 3 incorporates suitably arranged bushings 28.

In operation, from the setting shown in FIG. 2, tool disk 3 is connected tightly with tool disk mounting 2, because carrier bolts 27 are engaged in bushings 28 free of any movement. Catches 11' of coupling head 11 are engaged behind material portions 13 and the work space 21 shown to the left in FIG. 4 stands under pressure. The work space shown to the right in FIG. 4 is without pressure so that tool disk 3 is pressed positively with the force produced by cylinder-piston assembly 15 onto the bearing surface of tool disk mounting 2.

If tool disk 3 is to be changed, the tool turret is carried by means of the sliding carriage or the like supporting it into a position for detachment shown in FIG. 1 in which mounting disk 2 is located at some distance over a pallet 30. The longitudinal axis of drive shaft 4 in this detached setting extends in the direction of the standard or vertical axis, in other words, one of the axes in which the tool turret can be moved by means of the carriage supporting it. Now, the work space 21 shown to the left in FIG. 4 is made pressureless or depressurized. Tool disk 3 can then be lowered onto pallet 30. In this manner, carrier bolts 27 are moved out of bushings 28 and tie rod 10, as well as piston 14 arranged on it, are moved as far as their one end position. The electric motor is then switched on. Due to the nonrotatable connection of tie rod 10 with drive shaft 4 through cylinder 16, the coupling head 11 is rotated 90° relative to tool disk 3 into its retracted setting. As soon as this retracted setting is reached, housing 1 is driven back in the direction of the vertical axis into the original setting. Retraction of tie rod 10 brings coupling head 11 into the position shown in FIG. 1c, in which coupling head 11 is located outside recess 12. It would be possible to move coupling head 11 out of recess 12 by pressurizing the Work space 21 of cylinder-piston arrangement 15 shown to the left in FIG. 4. However, this would require a cylinder-piston assembly with a greater stroke.

Now, tool disk 3 is transported away by means of pallet 30. Another tool disk 3, which likewise lies on a pallet 30, is laid out on this pallet beneath tool disk mounting 2. Subsequently, housing 1 is lowered until coupling head 11 has reached the retracted setting in recess 12 shown in FIG. 1d. To close the bayonet fastening, the electric motor of the tool turret is switched on once again to rotate drive shaft 4 through a revolution of 90°, and thereby to rotate tie rod 10 through a revolution of 90°. This rotation brings catches 11' into the position in which they engage the rear of material portions 13.

In the exemplary embodiment, following this rotary movement, both work spaces 21 of cylinder-piston assembly 15 are made pressureless, because housing 1 is now lowered by a movement of tool turret along the vertical axis, whereby piston 14 is thrust forward and carrier bolts 27 are moved into bushings 28. However, it would also be possible to bring tool disk 3 into engagement with tool disk mounting 2 so that tool disk 3 could be moved against tool disk mounting 2 with the aid of cylinder-piston assembly 15. Finally, work space 21 shown to the left in FIG. 4 is again placed under pressure, so that tool disk 3 engages on tool disk mounting 2 under pressure.

While one embodiment has been chosen to illustrate the invention, it will be understood by those skilled in the art that various changes and modifications can be made therein without departing from the scope of the invention as defined in the appended claims.

What is claimed is:

1. A method for changing a tool disk carrying tools on a tool turret, the tool disk being connected detachably with a tool disk mounting which in turn can be rotated by means of a drive shaft relative to a housing of the tool turret and can be locked at certain desired angular settings with the housing, comprising the steps of:
    a) removing the tool disk from a work setting in which the tool disk is coupled with the drive shaft rotatable by a rotary drive by moving the tool disk along the axis of the drive shaft by means of a tie rod, movable axially relative to the drive shaft, away from the housing until the tool disk reaches a transfer position in which the tool disk is picked up by a conveyor device,
    b) rotating the drive shaft and the tie rod coupled therewith by means of the rotary drive out of a connection setting and into a detached setting disconnecting the tie ford from the tool disk,
    c) removing the tie rod from the tool disk,
    d) moving the tool disk from the transfer position and placing a different tool disk into the transfer position,
    e) engaging the tie rod with the different took disk,
    f) rotating the drive shaft and the tie rod by means of the rotary drive the detached setting into the connection setting in which the tie rod is connected and positively locked with the different tool disk in the axial direction, and
    g) moving the different tool disk to the work setting by axial movement of the tie rod relative to the drive shaft and the housing.

2. A machine, comprising:
    a tool turret housing;
    a tool disk mounting located in said housing;
    a tool disk having a first coupling means;
    a central drive shaft coupled to said tool disk mounting for simultaneous rotation therewith relative to said housing by a rotary drive;
    a tie rod arranged concentrically relative to said drive shaft and being axially slidable relative to said housing, said tie rod being nonrotatably coupled to said drive shaft;
    a control means, coupled to said tie rod, for controlling axial movement of said tie rod; and
    a second coupling means on one end of said tie rod for engaging said first coupling means to releasably couple said tie rod and said tool disk and to permit relative rotational movement of said coupling means between a release position in which tie rod and said tool disk can be detached and a locking position in which said tie rod and said tool disk are positively locked in axial positions.

3. A machine according to claim 2 wherein
    one of said tool disk and said tool disk mounting comprises at least one axially projecting carrier element; and
    the other of said tool disk and said tool disk mounting comprises a recess configured to mate with said carrier element and releasably receive said carrier element to nonrotatably connect said tool disk and said tool disk mounting when said carrier element is in said recess and to release said tool disk and said tool disk mounting for relative rotation when said tool disk and tool disk mounting are separated to remove said carrier element from said recess.

4. A machine according to claim 3 wherein said first and second coupling means form a bayonet connection.

5. A machine according to claim 3 wherein said tie rod is movable between a work setting in which said second coupling means and said tool disk are adjacent said housing engaging said carrier element in said recess and a transfer position in which said second coupling means and said tool disk are spaced from said housing disengaging said carrier element from said recess.

6. A machine according to claim 5 wherein
    said drive shaft is hollow; and said tie rod extends through said drive shaft to said control means.

7. A machine according to claim 6 wherein said housing and said tool disk mounting comprise toothed rim means for releasably preventing rotation therebetween independently of positioning of said tie rod.

8. A machine according to claim 2 wherein said first and second coupling means form a bayonet connection.

9. A machine according to claim 8 wherein
said second coupling means comprises at least one radial projection;
said first coupling means comprises a recess in said tool disk with a radially inwardly extending disk portion adjacent said tool disk mounting; and
said disk portion has an insert and retraction passage extending parallel to a longitudinal axis of said tie rod, said radial projection lying in said insert and retraction passage in the release position and being spaced from said insert and retraction passage in the locking position to engage an inside surface of said disk portion.

10. A machine according to claim 2 wherein
said drive shaft is hollow; and
said tie rod extends through said drive shaft to said control means.

11. A machine according to claim 2 wherein
said control means comprises a piston and cylinder assembly arranged coaxially relative to said tie rod.

12. A machine according to claim 11 wherein
said piston and cylinder assembly comprises a piston secured adjacent an end segment of said tie rod and a cylinder nonrotatably connected to said end segment of said tie rod and to said drive shaft.

13. A machine according to claim 12 wherein
said cylinder comprises an extension on one side concentric to said tie rod; and
an annular body surrounds said extension and forms a hydraulic rotary scanning and control means for coupling fluid feed lines to work spaces of said piston and cylinder assembly.

14. A machine according to claim 2 wherein sensing means for monitoring axial positioning of said tie rod relative to said housing is coupled to said tie rod.

15. A machine according to claim 2 wherein said tie rod is movable between a work setting in which said second coupling means and said tool disk are adjacent said housing and a transfer position in which said second coupling means and said tool disk are spaced from and outside of said housing and said drive shaft.

16. A machine according to claim 15 wherein
said drive shaft is hollow; and
said tie rod extends through said drive shaft to said control means.

* * * * *